UNITED STATES PATENT OFFICE.

THOMAS B. RANDELL, OF NEW YORK, N. Y.

IMPROVEMENT IN MEDICAL COMPOUNDS OR LINIMENTS.

Specification forming part of Letters Patent No. 119,179, dated September 19, 1871.

*To all whom it may concern:*

Be it known that I, THOMAS B. RANDELL, of New York, in the county and State of New York, have invented a new and Improved Composition for a Liniment; and I do hereby declare that the following is a full, clear, and exact description thereof, which will enable others skilled in the art to make and use the same.

This invention relates to a new mixture for the cure of rheumatism, neuralgia, lumbago, bruises, sprained swollen joints, pain in the chest, and other similar diseases and affections. The invention consists in the composition of the following-named ingredients, to wit., sweet-oil, phosphorus, asafetida.

The proportions are about one-half ounce of phosphorus and one-half ounce of asafetida to one gallon of oil. The phosphorus is first put in in the oil and dissolved by heat. For this purpose I prefer to insert the air-tight vesssel containing the oil in a pot of boiling, or at least heated, water. The phosphorus being dissolved the asafetida is next inserted and will readily dissolve in the oil.

This liniment is rubbed into the skin as near as convenient to the parts affected. The phosphorus enters the the osseous structure, and gives strength and vigor to the same, the asafetida aiding in its ready absorption by the system, while the oil is merely a convenient external vehicle.

Having thus described my invention, I claim as new and desire to secure by Letters Patent—

The composition made of the ingredients, substantially as and for the purposes herein specified.

T. B. RANDELL.

Witnesses:
   GEORGE W. MABEE,
   T. B. MOSHER.